United States Patent
Wang et al.

(10) Patent No.: US 12,248,427 B2
(45) Date of Patent: Mar. 11, 2025

(54) APPARATUS AND METHOD FOR TRANSMITTING DATA BASED ON SERIAL COMMUNICATION

(71) Applicant: LX SEMICON CO., LTD., Daejeon (KR)

(72) Inventors: Yun Sung Wang, Daejeon (KR); Kye Young Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 112 days.

(21) Appl. No.: 18/064,491

(22) Filed: Dec. 12, 2022

(65) Prior Publication Data
US 2023/0185758 A1 Jun. 15, 2023

(30) Foreign Application Priority Data
Dec. 14, 2021 (KR) .......... 10-2021-0178443

(51) Int. Cl.
*G06F 13/42* (2006.01)
(52) U.S. Cl.
CPC ............... *G06F 13/4295* (2013.01)

(58) Field of Classification Search
CPC .................................................. G06F 13/364
See application file for complete search history.

(56) References Cited

U.S. PATENT DOCUMENTS

| | | | | |
|---|---|---|---|---|
| 2009/0144471 A1* | 6/2009 | Lin | ......... | G06F 13/4252 710/110 |
| 2014/0122756 A1* | 5/2014 | Laskar | ......... | H03G 3/3042 710/106 |
| 2022/0188254 A1* | 6/2022 | Tang | ......... | G06F 13/4247 |

* cited by examiner

*Primary Examiner* — Henry Tsai
*Assistant Examiner* — Juanito C Borromeo
(74) *Attorney, Agent, or Firm* — Greenberg Traurig, LLP; Allen Kim

(57) ABSTRACT

A system for transmitting data based on serial communication, which allows the number of slave apparatuses connectable to one master apparatus to be increased, includes a master apparatus configured to generate an input data packet including first data, second data, and control data, and a slave apparatus group consisting of a plurality of slave apparatuses connected in a daisy-chain manner to the master apparatus, wherein each of the slave apparatuses determines first identification information (ID) using bits included in the first data, extracts second ID from the second data, and controls a target device using the control data when the first ID and the second ID match.

17 Claims, 12 Drawing Sheets

APPARATUS AND METHOD FOR TRANSMITTING DATA BASED ON SERIAL COMMUNICATION

CROSS-REFERENCE TO RELATED APPLICATIONS

This application claims the benefit of the Korean Patent Application No. 10-2021-0178443 filed on Dec. 14, 2021, which is hereby incorporated by reference as if fully set forth herein.

FIELD

The present disclosure relates to a data transmission system, and more particularly, to an apparatus capable of transmitting and receiving data in a serial communication method.

BACKGROUND

A data transmission system including a master apparatus and a slave apparatus that transmit and receive data using Serial Peripheral Interface (SPI) communication has been proposed.

In such the data transmission system, when a plurality of slave apparatuses are to be connected to one master apparatus, the number of slave apparatuses that can be connected to one master apparatus is inevitably limited because the number of packet generators that can be implemented in one master apparatus is limited.

In order to solve this problem, a method in which one master apparatus drives a plurality of slave apparatuses using a general-purpose input/output (GPIO) may be considered, but there is a limit in that it is difficult to control the plurality of slave apparatuses with one master apparatus because GPIO resources are also limited.

As another method, a method of connecting a plurality of slave apparatuses in parallel to one packet generator has been proposed, but there is a problem that fanout increases.

As still another method, a method of connecting one master apparatus to a plurality of slave apparatuses in a daisy-chain structure has been proposed. However, a serial data output (SDO) of the slave apparatus is generated by delaying a serial data input (SDI) by 8 bits according to an SPI protocol, and thus, when N slave apparatuses (N is a natural number greater than or equal to two) are connected in series to one master apparatus, an SDO of an N-th slave apparatus is inevitably delayed by N*8 bits from an initial SDI. Accordingly, data transmission takes a lot of time, and thus, there is a problem in that the number of slave apparatuses that can be connected to the master apparatus is limited.

Further, in the case of a method of connecting one master apparatus and a plurality of slave apparatuses in a daisy-chain structure, when the master apparatus wants to transmit data to a specific slave apparatus among the slave apparatuses, there is no way for each of the slave apparatuses to confirm that the data transmitted from the master apparatus is data therefor

SUMMARY

The present disclosure is directed to providing a system for transmitting data based on serial communication, capable of increasing the number of slave apparatuses connectable to one master apparatus.

The present disclosure is also directed to providing a system for transmitting data based on serial communication, capable of reducing the number of channels between a master apparatus and slave apparatuses.

The present disclosure is also directed to providing a system for transmitting data based on serial communication, allowing a slave apparatus to determine by itself whether input data is input data to be processed by itself.

The present disclosure is also directed to providing a system for transmitting data based on serial communication, capable of controlling local dimming of a display apparatus.

According to an aspect of the present disclosure, there is provided an apparatus for transmitting data based on serial communication, the apparatus including a master apparatus configured to generate an input data packet including first data, second data, and control data, and a slave apparatus group consisting of a plurality of slave apparatuses connected in a daisy-chain manner to the master apparatus, wherein each of the slave apparatuses determines first identification information (ID), which is ID thereof, using bits included in the first data, extracts second ID, which is ID of the slave apparatus to process the control data, from the second data, and controls a target device connected to the slave apparatus, using the control data when the first ID and the second ID match.

According to another aspect of the present disclosure, there is provided a slave apparatus including a D-flip-flop circuit configured to output an output data packet, which is generated by delaying an input data packet by one bit, when the input data packet including first data, second data, and control data is input, and a control circuit configured to determine first identification information (ID), which is ID thereof, using bits included in the first data, extract second ID, which is ID of the slave apparatus to process the control data, from the second data, and control a target device using the control data when the first ID and the second ID match.

According to still another aspect of the present disclosure, there is provided a master apparatus connected in a daisy-chain manner to a plurality of slave apparatuses, the master apparatus including a controller configured to determine bits of first data used for each of the slave apparatuses to determine first identification information (ID), which is ID thereof, bits of second data including second ID, which is ID of the slave apparatus to process control data among the plurality of slave apparatuses, and bits of the control data, and a packet generator configured to generate an input data packet by arranging the bits, which are determined by the controller, according to a serial peripheral interface (SPI) protocol, and output the input data packet to a first slave apparatus among the plurality of slave apparatuses, wherein the controller sets a value of a most significant bit (MSB) among the bits of the first data to "1," and the first ID is determined using the MSB.

According to yet another aspect of the present disclosure, there is provided a method of transmitting data based on serial communication between a master apparatus and a plurality of slave apparatuses, the method including receiving an input data packet including first data, second data, and control data, performing a count operation in response to a first edge of a serial clock signal, determining first identification information (ID) using a count value at a time at which a bit firstly having a value of "1" is input among bits included in the first data, extracting second ID from the second data, comparing the determined first ID and the extracted second ID, and controlling a target device using the control data when the determined first ID and the extracted second ID match

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
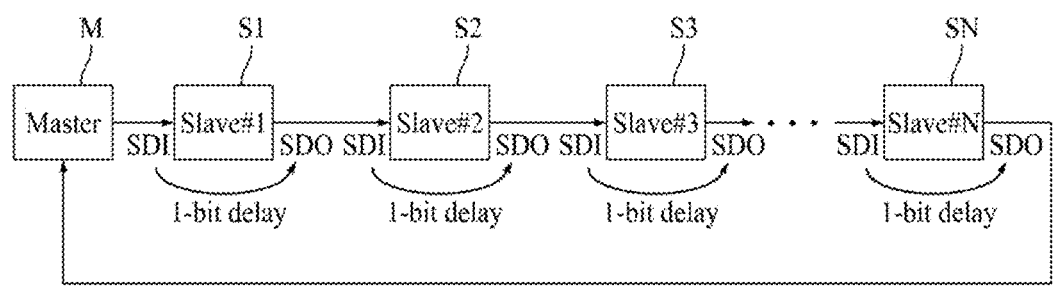
FIG. 1 is a block diagram schematically illustrating a configuration of a system for transmitting data based on serial communication according to one embodiment of the present disclosure.

Throughout the specification, like reference numerals refer to substantially like components. In the following description, detailed descriptions of configurations and functions not related to a core configuration of the present disclosure and known in the art may be omitted. The terms used in this specification should be understood as follows.

Advantages and features of the present disclosure and implementation methods thereof will be clarified through the following embodiments described with reference to the accompanying drawings. However, the present disclosure is not limited to the embodiments described below and may be implemented with a variety of different modifications. The embodiments are merely provided to allow those skilled in the art to completely understand the scope of the present disclosure, and the present disclosure is defined only by the scope of the claims.

The figures, dimensions, ratios, angles, numbers, and the like disclosed in the drawings for describing the embodiments of the present disclosure are merely illustrative and are not limited to details shown in the present disclosure. Throughout the specification, like reference numerals refer to like components. Further, in describing the present disclosure, detailed descriptions of well-known technologies will be omitted when it is determined that they may unnecessarily obscure the gist of the present disclosure.

Terms such as "including," "having," and "composed of" used herein are intended to allow other elements to be added unless the terms are used with the term "only." Any references to the singular may include the plural unless expressly stated otherwise.

Components are interpreted as including an ordinary error range even if not expressly stated.

For the description of a temporal relationship, for example, when a temporal relationship is described as "after," "subsequently to," "next," "before," and the like, a non-consecutive case may be included unless the term "immediately" or "directly" is used in the expression.

Although the terms "first," "second," and the like may be used herein to describe various components, the components are not limited by the terms. These terms are used only to distinguish one component from another component. Therefore, a first component described below may be a second component within the technical spirit of the present disclosure.

When the term "at least one" is used, it should be understood to include all possible combinations of one or more of the associated listed items. For example, the meaning of "at least one of a first item, a second item, and a third item" may mean a combination of all items that can be presented from two or more of the first item, the second item and the third item as well as each of the first item, the second item or the third item.

The features of various embodiments of the present disclosure can be partially or entirely bonded to or combined with each other and can be interlocked and operated in technically various ways, and the embodiments can be carried out independently of or in association with each other.

Hereinafter, embodiments of the present specification will be described in detail with reference to the accompanying drawings.

FIG. 1 is a block diagram schematically illustrating a configuration of a system for transmitting data based on serial communication according to one embodiment of the present disclosure.

As shown in FIG. 1, a system for transmitting data based on serial communication 100 (hereinafter, referred to as "data transmission system") according to one embodiment of the present disclosure includes a master apparatus M and a plurality of slave apparatuses S1 to SN connected in a daisy-chain manner to the master apparatus M.

According to the present disclosure, one master apparatus M may be connected in a daisy-chain manner to the plurality of slave apparatuses S1 to SN. Accordingly, the number of channels for connecting between the master apparatus M and the slave apparatuses S1 to SN is reduced, and a time for transmitting the input data packet SDI is reduced, so that a data processing speed is increased. In addition, the time for transmitting the input data packet SDI is reduced, and a timing margin is enhanced, so that a large number of slave apparatuses S1 to SN may be connected in a daisy-chain manner to one master apparatus M.

According to one embodiment of the present disclosure, each of the master apparatus M and slave apparatuses S1 to SN may be a semiconductor integrated circuit or a package in which a semiconductor integrated circuit is packaged.

As shown in FIG. 1, the master apparatus M generates an input data packet SDI and transmits the input data packet SDI to the first slave apparatus S1. The first slave apparatus S1 generates an output data packet SDO delayed by one bit from the received input data packet SDI and outputs the output data packet SDO to a second slave apparatus S2. The second slave apparatus S2 uses the output data packet SDO output from the first slave apparatus S1 as the input data packet SDI and delays the input data packet SDI again by one bit to generate the output data packet SDO, and outputs the output data packet SDO to a third slave apparatus S3.

As described above, according to the present disclosure, since the slave apparatuses S1 to SN output the input data packet SDI by delaying the input data packet SDI only by one bit, even when the data transmission system 100 includes N slave apparatuses S1 to SN, a total delay occurs only by N*one bit and thus a data transmission time is reduced, so that the number of the slave apparatuses S1 to SN connectable to the master apparatus M may be increased.

Hereinafter, a configuration of the master apparatus M and the slave apparatuses S1 to SN according to the present disclosure will be described in more detail with additional reference to FIGS. 2 to 8.

Figure 2:
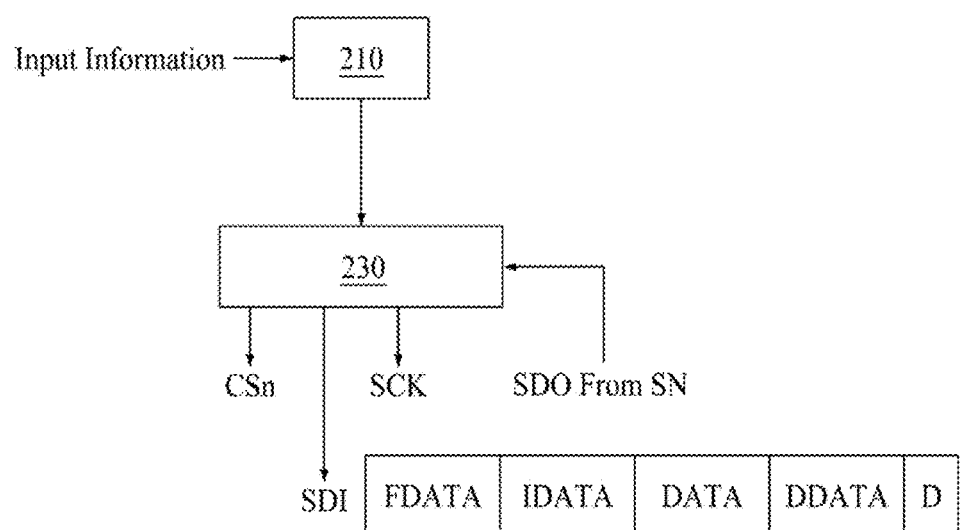
FIG. 2 is a block diagram schematically illustrating a configuration of a master apparatus shown in FIG. 1.
Figure 3:
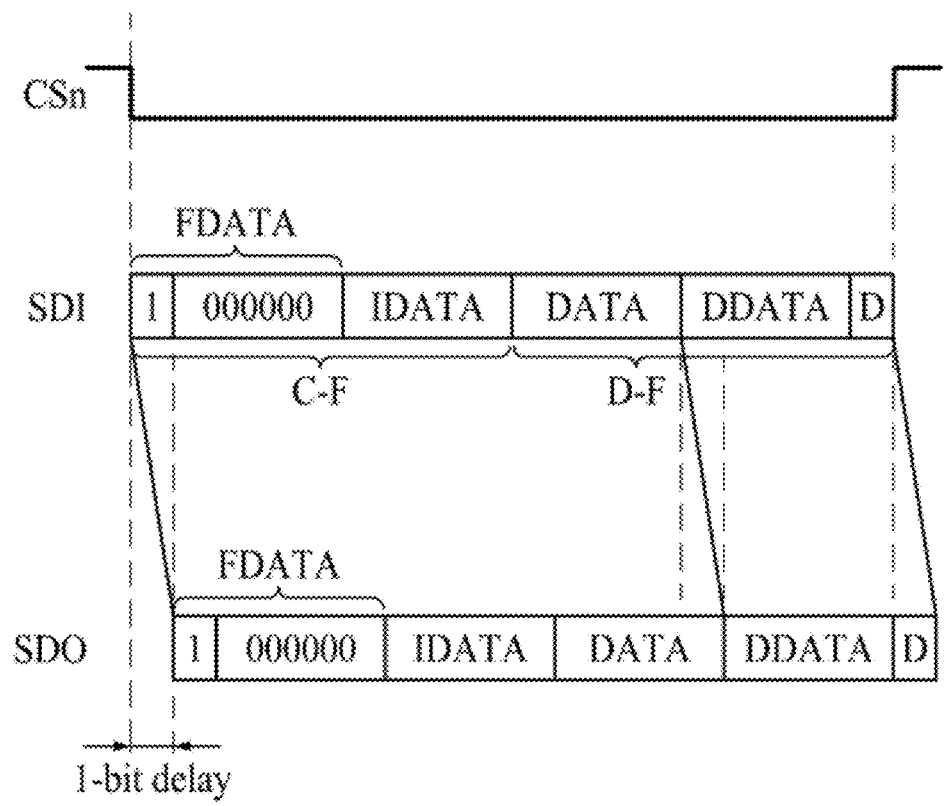
FIG. 3 is a diagram exemplarily illustrating a data format of each of an input data packet generated by the master apparatus of FIG. 2 and an output data packet generated by delaying the input data packet by one bit.

FIG. 2 is a block diagram schematically illustrating a configuration of a master apparatus according to one embodiment of the present disclosure, and FIG. 3 is a diagram exemplarily illustrating a data format of each of an input data packet generated by the master apparatus shown in FIG. 2 and an output data packet generated by delaying the input data packet by one bit.

As shown in FIGS. 1 and 2, the master apparatus M connected in a daisy-chain manner to the plurality of slave apparatuses S1 to SN includes a controller 210 and a packet generator 230. In FIG. 2, for convenience of description, the master apparatus M is illustrated as including one packet generator 230, but in another embodiment, the master apparatus M may include a plurality of packet generators 230.

The controller 210 receives control data from an external source (not shown). In one embodiment, the controller 210 may receive dimming data as the control data from the external source when the data transmission system 100 according to the present disclosure is used for controlling local dimming of a display device.

Additionally, the controller 210 determines bits to be included in the input data packet SDI based on the control data so that the packet generator 230 may generate the input data packet SDI.

Specifically, the controller 210 determines bits constituting first data FDATA, bits constituting second data IDATA, and bits constituting control data DATA, which are to be included in the input data packet SDI. The first data FDATA includes bits for enabling a specific slave apparatus to determine by itself which slave apparatus it is among the plurality of slave apparatuses S1 to SN. As described below, each of the slave apparatuses S1 to SN may set identification information (ID) thereof (hereinafter, referred to as "first ID") using the bits included in the first data FDATA.

In one embodiment, a most significant bit among the bits included in the first data FDATA has a value of "1," and the first data FDATA may have a value of 80 (hex). Here, "hex" refers to hexadecimal.

The second data IDATA includes bits representing unique information (hereinafter referred to as "second ID") specifying the slave apparatus, which needs to process the control data DATA, among the plurality of slave apparatuses S1 to SN.

The control data DATA includes bits for controlling the target device to be controlled. In one embodiment, when the data transmission system 100 according to the present disclosure is used for controlling local dimming of the display device, the control data may be the dimming data received from the external source. According to above embodiment, each of slave apparatuses S1 to SN controls local dimming of a light source connected to each of the slave apparatuses S1 to SN using the dimming data.

Meanwhile, the controller 210 may further determine bits to be included in first dummy data DDATA indicating the number of the plurality of slave apparatuses S1 to SN. In one embodiment, the controller 210 may set all values of the bits to be included in the first dummy data DDATA to "0". The controller 210 further determines the bits of the first dummy data DDATA, which indicates the number of the plurality of slave apparatuses S1 to SN, because although each of the N slave apparatuses S1 to SN should receive all the control data DATA included in the input data packet SDI while a chip selection signal CSn is maintained at a low level, the chip selection signal CSn may transition to a high level in a state in which an N-th slave apparatus SN does not receive all of the control data DATA since the input data packet SDI output from the master apparatus M is delayed by one bit while passing through each of the N slave apparatuses S1 to SN, and thus, the N-th slave apparatus SN may not receive some of the control data DATA.

Further, the controller 210 may additionally determine a bit to be included in second dummy data D. The second dummy data D means one dummy bit that is set to safely receive the output data packet SDO before the chip selection signal CSn ends. In one embodiment, one bit of the second dummy data D may be set to "0."

The packet generator 230 generates the input data packet SDI by arranging the bits determined by the controller 210 according to a serial peripheral interface (SPI) communication protocol.

The packet generator 230 outputs the generated input data packet SDI to the first slave apparatus S1 among the plurality of slave apparatuses S1 to SN connected thereto in a daisy-chain manner. The packet generator 230 may output the input data packet SDI to the first slave apparatus S1 together with the chip selection signal CSn and a serial clock signal SCK.

Here, the chip selection signal CSn refers to a signal for selecting the slave apparatus to be operated among the plurality of slave apparatuses S1 to SN, the serial clock signal SCK refers to a clock signal used by each of the slave apparatuses S1 to SN to process the first ID, the second ID, and the control data.

FIG. 3 illustrates an example of the input data packet transmitted to the first slave apparatus S1 by the packet generator 230. As shown in FIG. 3, the input data packet SDI, which is input to the first slave apparatus S1, may include a command field C_F and a data field D_F. The command field C_F may include the first data FDATA and the second data IDATA, and the data field D_F may include the control data DATA. In FIG. 3, it is illustrated that one control data DATA is included in the data field D_F, but a plurality of pieces of control data DATA may be included in the data field D_F according to the number of target devices controlled by each of the slave apparatuses S1 to SN. For example, when each of the slave apparatuses S1 to SN controls K target devices, the data field D_F may include K pieces of control data DATA1 to DATAK. Depending on the embodiment, the data field D_F may further include the first dummy data DDATA and the second dummy data D.

Meanwhile, the packet generator 230 receives the output data packet SDO from the N-th slave apparatus SN, which is the last slave apparatus among the plurality of slave apparatuses S1 to SN, and transmits the received output data packet SDO to the controller 210. The controller 210 may check whether the input data packet SDI is normally transmitted to the plurality of slave apparatuses S1 to SN by calculating delayed bits of the received output data packet SDO.

Hereinafter, the slave apparatus according to the present disclosure will be described in detail with reference to FIGS. 4 to 7.

Figure 4:
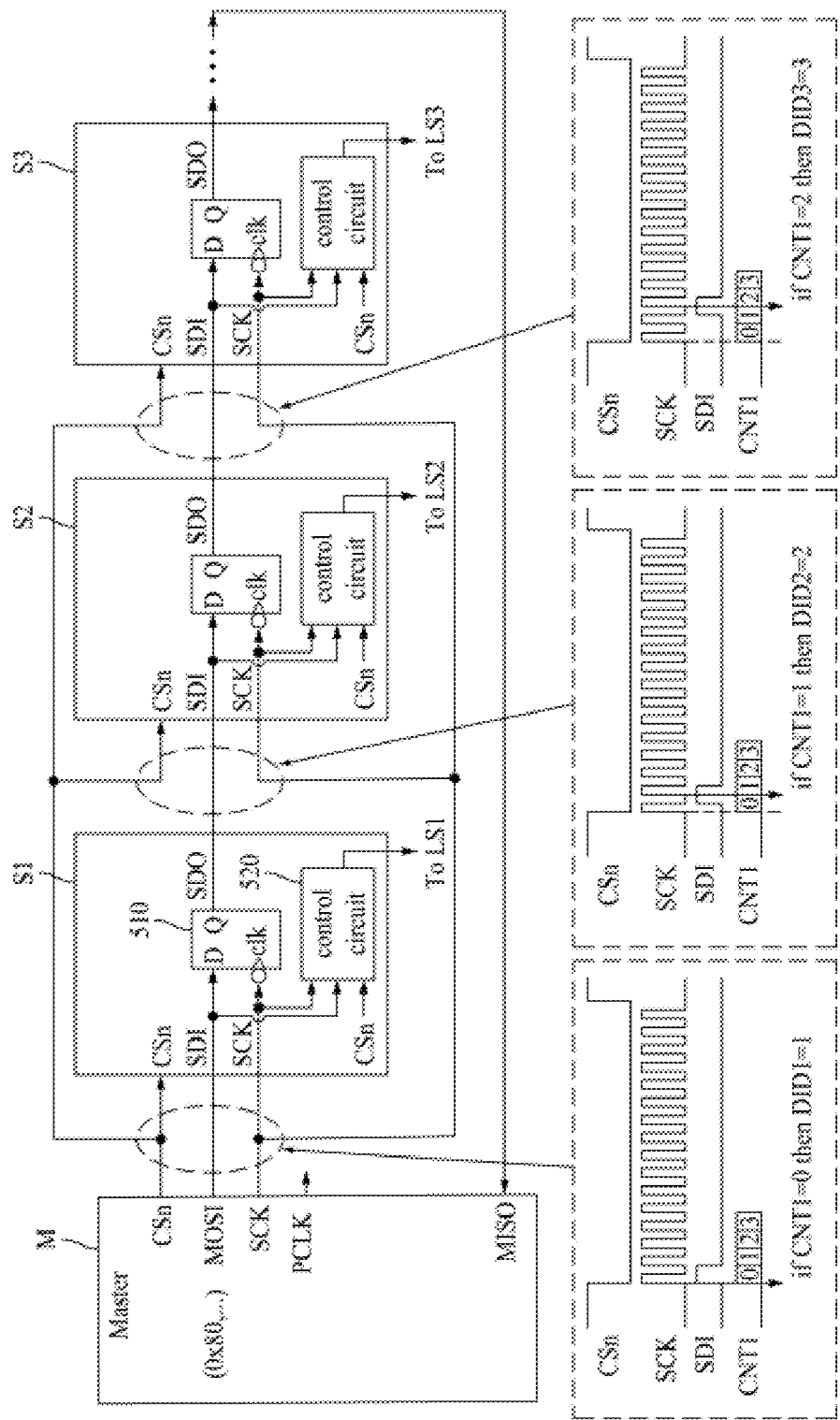
FIG. 4 is a timing diagram for describing slave apparatuses shown in FIG. 1 and an operation of each of the slave apparatuses.

FIG. 4 is a timing diagram for describing slave apparatuses shown in FIG. 1 and an operation of each of the slave apparatuses. It is assumed that the structure and operation method of each slave apparatus are the same, and hereinafter, for convenience of description, descriptions are made based on operations of first to third slave apparatuses S1 to S3.

The master apparatus M transmits the chip selection signal CSn and the serial clock signal SCK to the first to third slave apparatuses S1 to S3 connected in a daisy-chain manner to the packet generator 230. The master apparatus M transmits a master output slave input MOSI to the first slave apparatus S1 connected to the packet generator 230. The master apparatus M receives a master input slave output MISO, which is output from the N-th slave apparatus SN, through the packet generator 230.

The master output slave input MOSI refers to the input data packet SDI transmitted to the first slave apparatus S1, and the master input slave output MISO refers to the output data packet SDO transmitted from the N-th slave apparatus SN.

As shown in FIG. 4, the first slave apparatus S1 includes a D-flip-flop circuit 510 and a control circuit 520.

The D-flip-flop circuit 510 captures the input data packet SDI at a second edge (e.g., a falling edge) of the serial clock signal SCK to output the output data packet SDO. A setup timing margin is improved as the D-flip-flop circuit 510 that responds to a falling edge is used.

The D-flip-flop circuit 510 outputs the output data packet SDO generated by delaying the input data packet SDI by one bit (also referred to as a one-bit time) to the second slave apparatus S2.

The control circuit 520 performs a count operation in response to a first edge (e.g., a rising edge) of the serial clock signal SCK, and determines the first ID using a count value at the time at which a bit firstly having a value of "1" among the bits included in the first data FDATA is input. The control circuit 520 compares the determined first ID with the second ID included in the second data IDATA, and controls the target device LS1 connected to the first slave apparatus S1 using the control data DATA when the first ID and the second ID match, and discards the control data DATA when the first ID and the second ID do not match.

For example, when a count value CNT1 at the time at which a bit firstly having a value of "1" among the bits (e.g., 10000000 (bin)) included in the first data FDATA of the input data packet SDI that is input to the first slave apparatus S1 is input is 0 (dec) and an initial count value is 0 (dec), the first slave apparatus S1 sets ID DID1 thereof to 1 (dec). Here, "bin" refers to binary, and "dec" refers to decimal.

The second slave apparatus S2, which receives the output data packet SDO delayed by one bit by the D-flip-flop circuit 510 of the first slave apparatus S1 as the input data packet SDI, sets ID DID2 thereof to 2 (dec) when the count value CNT1 at the time at which the bit firstly having a value of "1" among the bits included in the first data FDATA of the input data packet SDI is input, is 1 (dec) and the initial count value is 0 (dec).

The third slave apparatus S3, which receives the output data packet SDO delayed by one bit by the D-flip-flop circuit of the second slave apparatus S2 as the input data packet SDI, sets ID DID3 thereof to 3 (dec) when the count value CNT1 at the time at which the bit firstly having a value of "1" among the bits included in the first data FDATA of the input data packet SDI is input, is 2 (dec) and the initial count value is 0 (dec).

Each of the slave apparatuses S1 to SN determines ID DIDi thereof using a timing when the count value CNT1 at the time at which the bit firstly having a value of "1" among the bits included in the first data FDATA of the input data packet SDI is input, is detected and the initial count value Since each of the slave apparatuses S1 to SN captures the input data packet SDI at the second edge of the serial clock signal SCK to output the output data packet SDO, N bits delay is generated between the input data packet SDI of the first slave apparatus S1 and the output data packet SDO of the N-th slave apparatus SN.

Figure 5:
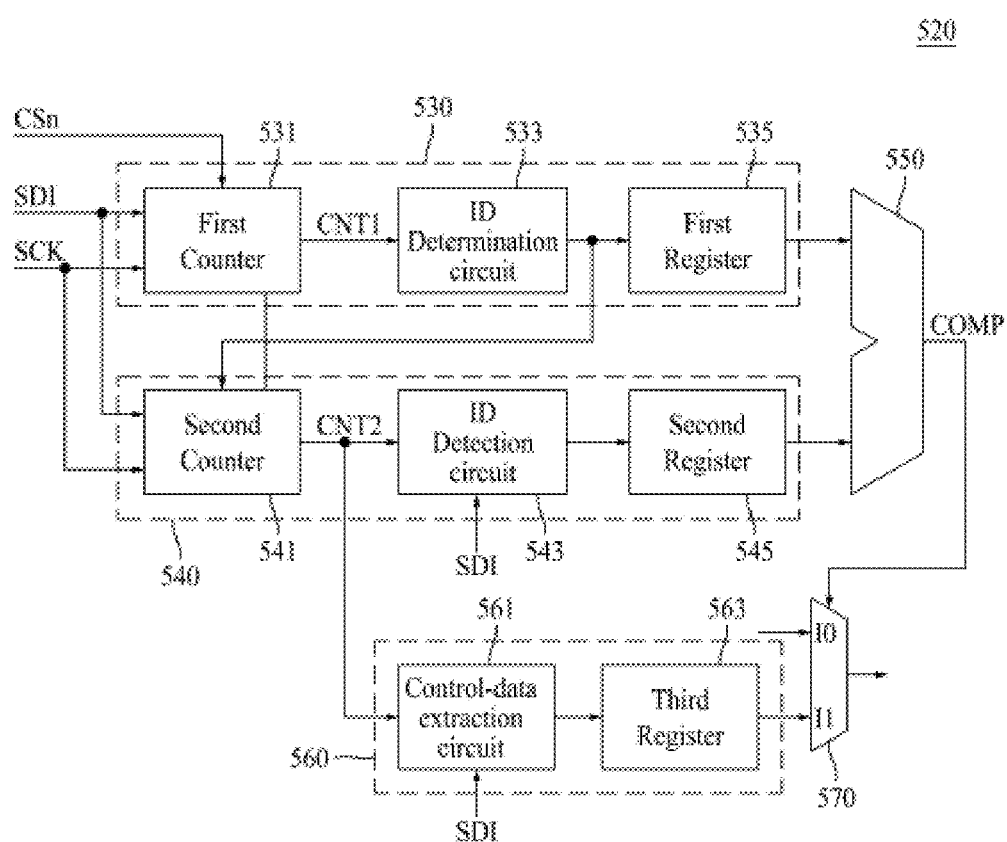
FIG. 5 is a block diagram specifically illustrating a configuration of a control circuit shown in FIG. 4.
Figure 6:
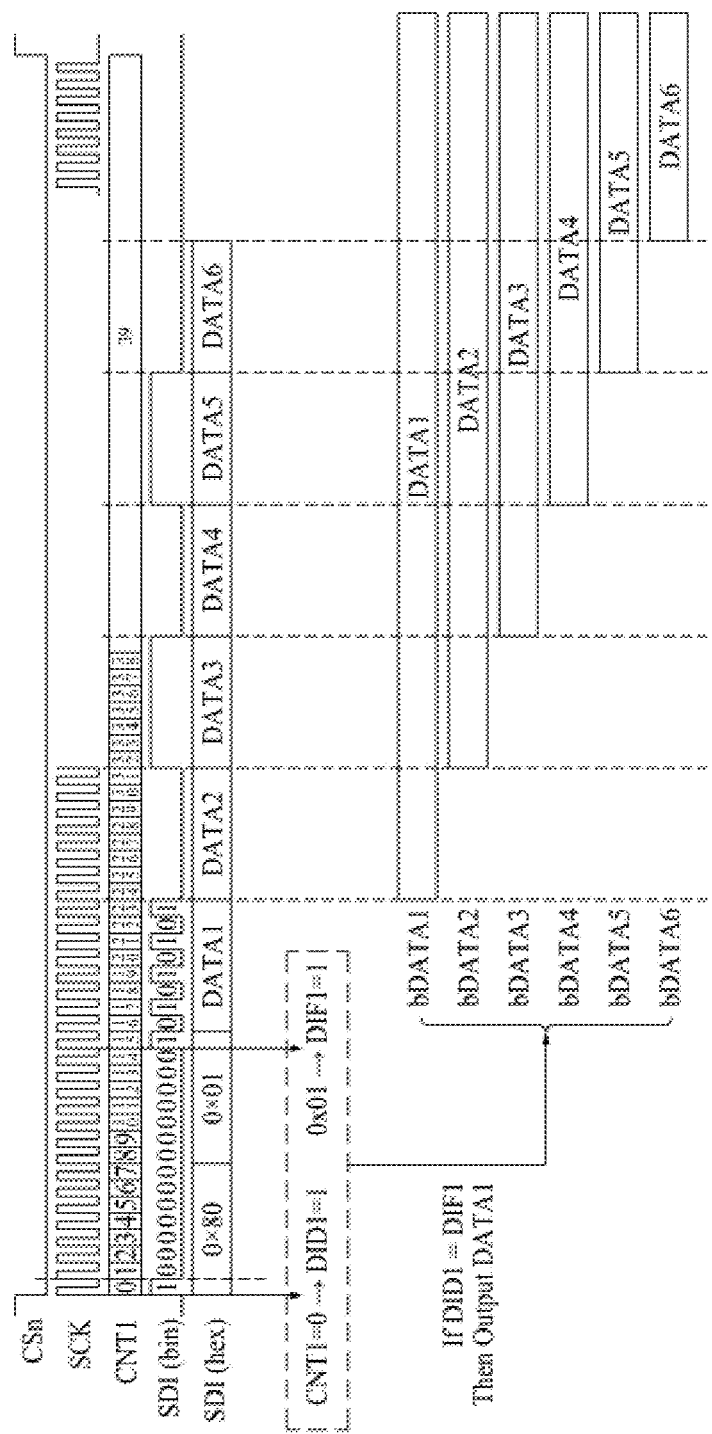
FIG. 6 is a timing diagram illustrating a data format of the input data packet generated by the master apparatus shown in FIG. 2 and a detailed operation of the control circuit.

FIG. 5 is a block diagram specifically illustrating a configuration of a control circuit shown in FIG. 4, FIG. 6 is a timing diagram illustrating a data format of the input data packet generated by the master apparatus shown in FIG. 2 and a detailed operation of the control circuit.

Referring to FIGS. 1 to 5, the control circuit 520 includes a first-ID processing circuit 530, a second-ID processing circuit 540, a comparison circuit 550, a control-data processing circuit 560, and a selection circuit 570.

The first-ID processing circuit 530 performs a first count operation in response to a first edge of the serial clock signal SCK. The first-ID processing circuit 530 outputs a count value at the time at which the bit firstly having a value of "1" among the bits included in the first data FDATA is input, as a first count value CNT1. The first-ID processing circuit 530 determines first ID DID1 of the first slave apparatus S1 using the first count value CNT1 or using the first count value CNT1 and an initial count value, and stores the first ID DID1.

To this end, the first-ID processing circuit 530 may include a first counter 531, an ID determination circuit 533, and a first register 535.

The first counter 531 is reset in response to a transition of the chip selection signal CSn from a high level to a low level, and performs the first count operation in response to the first edge of the serial clock signal SCK. The first counter 531 outputs the count value at the time at which the bit firstly having a value of "1" among the bits included in the first data FDATA is input, as the first count value CNT1.

The ID determination circuit 533 uses the first count value CNT1 or uses the first count value CNT1 and the initial count value to determine the first ID DID1.

The first count value CNT1 shown in FIG. 6 illustrates output values of the first counter included in each of the N slave apparatuses S1 to SN represented in time series. In FIG. 6, for convenience of description, a case in which the slave apparatuses S1 to SN are implemented as 40 slave apparatuses and the control data DATA includes six pieces of control data DATA1 to DATA6 is illustrated as an example. In FIG. 6, bDATA1 to bDATA6 refer to pieces of delayed data.

When the first data FDATA is 10000000 (bin) or 80 (hex), and the second ID included in the second data IDATA is 00000001 (bin) or 01 (hex), the first count value CNT1 of the first counter included in an i-th slave apparatus Si among 40 slave apparatuses S1 to S40 is "i-1."

For example, the first count value CNT1 of the first counter included in the first slave apparatus S1 is 0 (dec), the first count value CNT1 of the first counter included in the second slave apparatus S2 is 1 (dec), the first count value CNT1 of the first counter included in the third slave apparatus S3 is 2 (dec), the first count value CNT1 of the first counter included in a 39-th slave apparatus S39 is 38 (dec), and the first count value CNT1 of the first counter included in a 40-th slave apparatus S40 is 39 (dec).

When the initial count value of the first counter included in each of the slave apparatuses S1 to S40 is 0 (dec), since the ID determination circuit included in each of the slave apparatuses S1 to S40 identifies the initial count value of the first counter, the ID determination circuit may determine the first ID of each of the slave apparatuses S1 to S40 by adding 1 (dec) to the corresponding first count value CNT1.

Thus, the first ID of the first slave apparatus S1 is 1 (dec) when the first count value CNT1 of the first counter included in the first slave apparatus S1 is 0 (dec), the first ID of the second slave apparatus S2 is 2 (dec) when the first count value CNT1 of the first counter included in the second slave apparatus S2 is 1 (dec), the first ID of the 39-th slave apparatus S39 is 39 (dec) when the first count value CNT1 of the first counter included in the 39-th slave apparatus S39 is 38 (dec), and the first ID of the 40-th slave apparatus S40 is 40 (dec) when the first count value CNT1 of the first counter included in the 40-th slave apparatus S40 is 39 (dec).

In another embodiment, when the initial count value of the first counter included in each of the slave apparatuses S1 to S40 is 1 (dec), since the ID determination circuit included in each of the slave apparatuses S1 to S40 identifies the initial count value of the first counter, the corresponding first count value CNT1 may be determined as the first ID of each of the slave apparatuses S1 to S40 as it is.

For example, the first ID of the first slave apparatus S1 is 1 (dec) when the first count value CNT1 of the first counter included in the first slave apparatus S1 is 1 (dec), the first ID of the second slave apparatus S2 is 2 (dec) when the first count value CNT1 of the first counter included in the second slave apparatus S2 is 2 (dec), the first ID of the 39-th slave apparatus S39 is 39 (dec) when the first count value CNT1 of the first counter included in the 39-th slave apparatus S39 is 39 (dec), and the first ID of the 40-th slave apparatus S40 is 40 (dec) when the first count value CNT1 of the first counter included in the 40-th slave apparatus S40 is 40 (dec).

The first register 535 receives and stores the first ID DID1 determined by the ID determination circuit 533.

The second-ID processing circuit 540 extracts second ID DIF1 from the second data IDATA, and stores the second ID DIF1.

Referring to FIG. 6, when the second ID included in the second data IDATA of the input data packet SDI is 00000001 (bin) or 01 (hex), the second-ID processing circuit included in each of the slave apparatuses S1 to S40 extracts 00000001 (bin) or 01 (hex) included in the second data IDATA of the input data packet SDI, which is input to the respective slave apparatuses S1 to S40, as the second ID DIF1.

To this end, the second-ID processing circuit 540 may include a second counter 541, an ID detection circuit 543, and a second register 545.

The second counter 541 performs a second count operation using the first edge of the serial clock signal SCK to output a second count value CNT2.

The second counter 541 may be reset in response to an output signal of the ID determination circuit 533, and may perform the second count operation using the first edge of the serial clock signal SCK, which is input after the reset, to output the second count value CNT2.

The ID detection circuit 543 receives the input data packet SDI and the second count value CNT2, detects a start position of the second data IDATA using the second count value CNT2 and first information, and extracts the second ID DIF1 from the second data IDATA using the detection result.

The first information may include timing information about a time elapsed from when the bit firstly having a value of "1" among the bits included in the first data FDATA is detected until the second data IDATA is input.

For example, when it is assumed that the second data IDATA starts after seven cycles of the serial clock signal SCK after the bit firstly having a value of "1" among the bits included in the first data FDATA is detected, the ID detection circuit 543 may detect the start position of the second data IDATA using the second count value CNT2 and extract the second ID DIF1 from the second data IDATA using the detection result.

The second register 545 receives and stores the second ID DIF1 output from the ID detection circuit 543.

The comparison circuit 550 compares the first ID DID1 and the second ID DIF1. In one embodiment, when each of the first ID DID1 and the second ID DIF1 is K-bits data, the comparison circuit 550 may compare the first ID DID1 and the second ID DIF1 in units of bits to generate a comparison signal COMP. Here, K is a natural number greater than or equal to two.

Since the first ID DID1 stored in the first register 535 of the first slave apparatus S1 among the slave apparatuses S1 to SN is 00000001 (bin), and the second ID DIF1 stored in the second register 545 of the first slave apparatus S1 is 00000001 (bin), the comparison circuit 550 outputs the comparison signal COMP having a high level.

However, since the first ID stored in the first register of the i-th slave apparatus Si (where 2≤i≤N) except for the first slave apparatus S1 among the slave apparatuses S1 to SN and the second ID (=00000001 (bin)) stored in the second register of the i-th slave apparatus do not match, the comparison circuit 550 of the i-th slave apparatus Si outputs the comparison signal having a low level.

For example, the first ID (=00000010 (bin) or 00000011 (bin)) stored in the first register of the second slave apparatus S2 or the third slave apparatus S3 and the second ID (=00000001 (bin)) stored in the second register of the second slave apparatus S2 or the third slave apparatus S3 do not match, the comparison circuit of the second slave apparatus S2 or the third slave apparatus S3 outputs the comparison signal having a low level.

The control-data processing circuit 560 extracts the control data DATA from the input data packet SDI and stores the control data DATA. To this end, the control-data processing circuit 560 may include a control-data extraction circuit 561 and a third register 563.

The control-data extraction circuit 561 receives the input data packet SDI and the second count value CNT2, detects a start position of the control data DATA using the second count value CNT2 and second information, and extracts the control data DATA using the detection result.

The second information may include timing information about a time elapsed from when the bit firstly having a value of "1" among the bits included in the first data FDATA is detected until the control data DATA is input.

For example, when it is assumed that the control data DATA starts after 15 cycles of the serial clock signal SCK after the bit firstly having a value of "1" among the bits included in the first data FDATA is detected, the control-data extraction circuit 561 may detect the start position of the control data DATA using the second count value CNT2 and extract the control data DATA using the detection result.

The third register 563 receives and stores the control data DATA output from the control-data extraction circuit 561. Each of the first to third registers 535, 545, and 563 is an example of a data storage device.

In response to the comparison signal COMP output from the comparison circuit 550, the selection circuit 570 outputs one of dummy data corresponding to a first voltage (e.g., the ground voltage) input through a first input terminal thereof and the control data DATA input through a second input terminal thereof to the target device LS1.

Depending on the embodiment, the selection circuit 570 may be replaced with a switch that outputs the control data DATA output from the third register 563 to the target device LS1 in response to the comparison signal COMP having a high level output from the comparison circuit 550.

Figure 7:
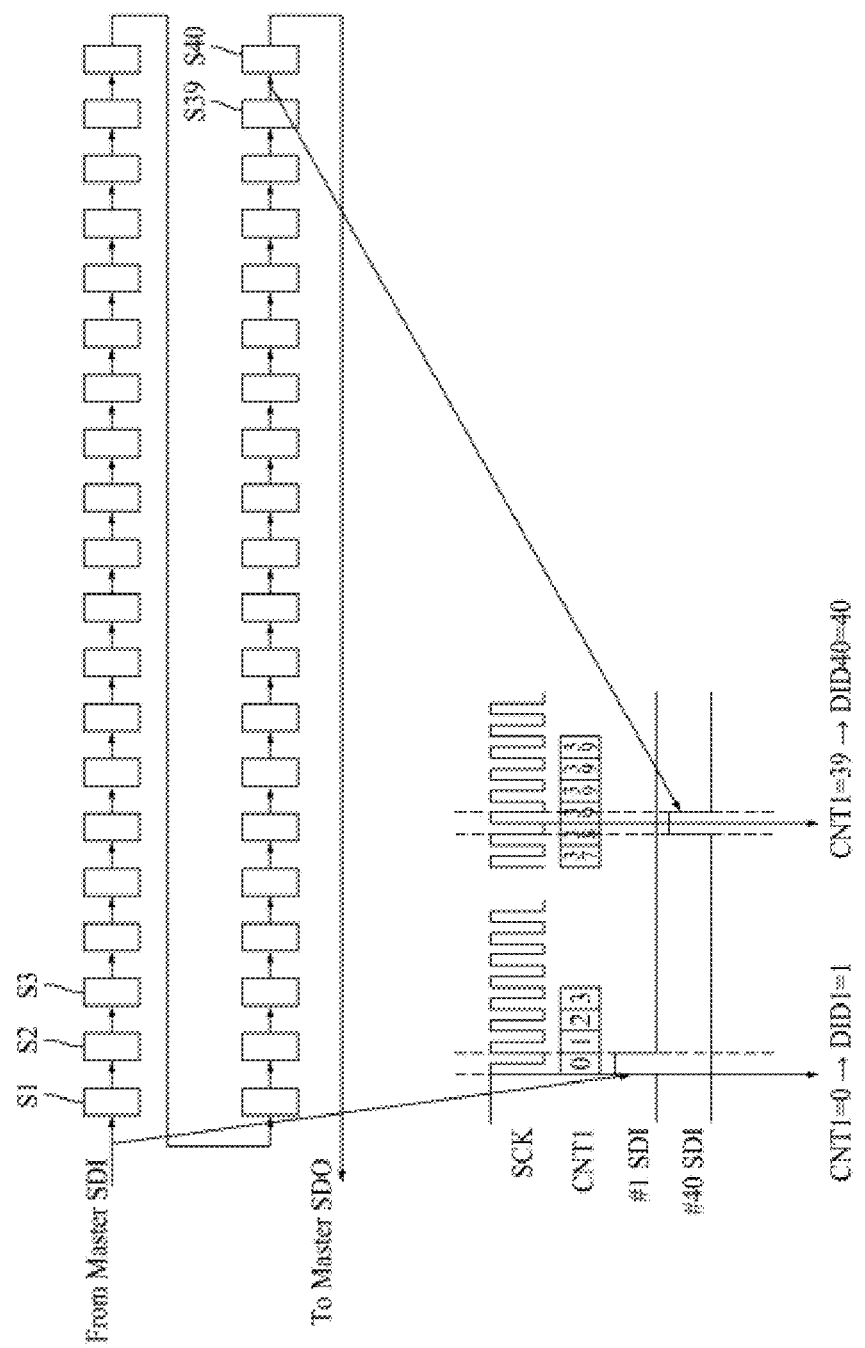
FIG. 7 is a diagram illustrating a method for each of the slave apparatuses shown in FIG. 1 to calculate identification information (ID) thereof.

FIG. 7 is a diagram illustrating a method for each of the slave apparatuses shown in FIG. 1 to calculate identification information (ID) thereof. In FIG. 7, for convenience of description, a case in which the slave apparatuses S1 to SN are implemented as 40 slave apparatuses is illustrated as an example.

Referring to FIGS. 1 and 7, when the master apparatus M and the plurality of slave apparatuses S1 to S40 are connected in a daisy-chain manner and the first data of the input data packet SDI input to the first slave apparatus S1 is 80 (hex), the first ID DID1 of the first slave apparatus S1 is determined to be 1 (dec) since the first count value CNT1 of the first counter 531 of the first slave apparatus S1 is 0 (dec), and first ID DID40 of the 40-th slave apparatus S40 is determined to be 40 (dec) since the first count value CNT1 of the first counter of the 40-th slave apparatus S40 is 39 (dec).

At this time, as shown in FIGS. 6 and 7, the first count value CNT1 of the first counter of the 40-th slave apparatus S40 is maintained as 39 (dec).

Figure 8:
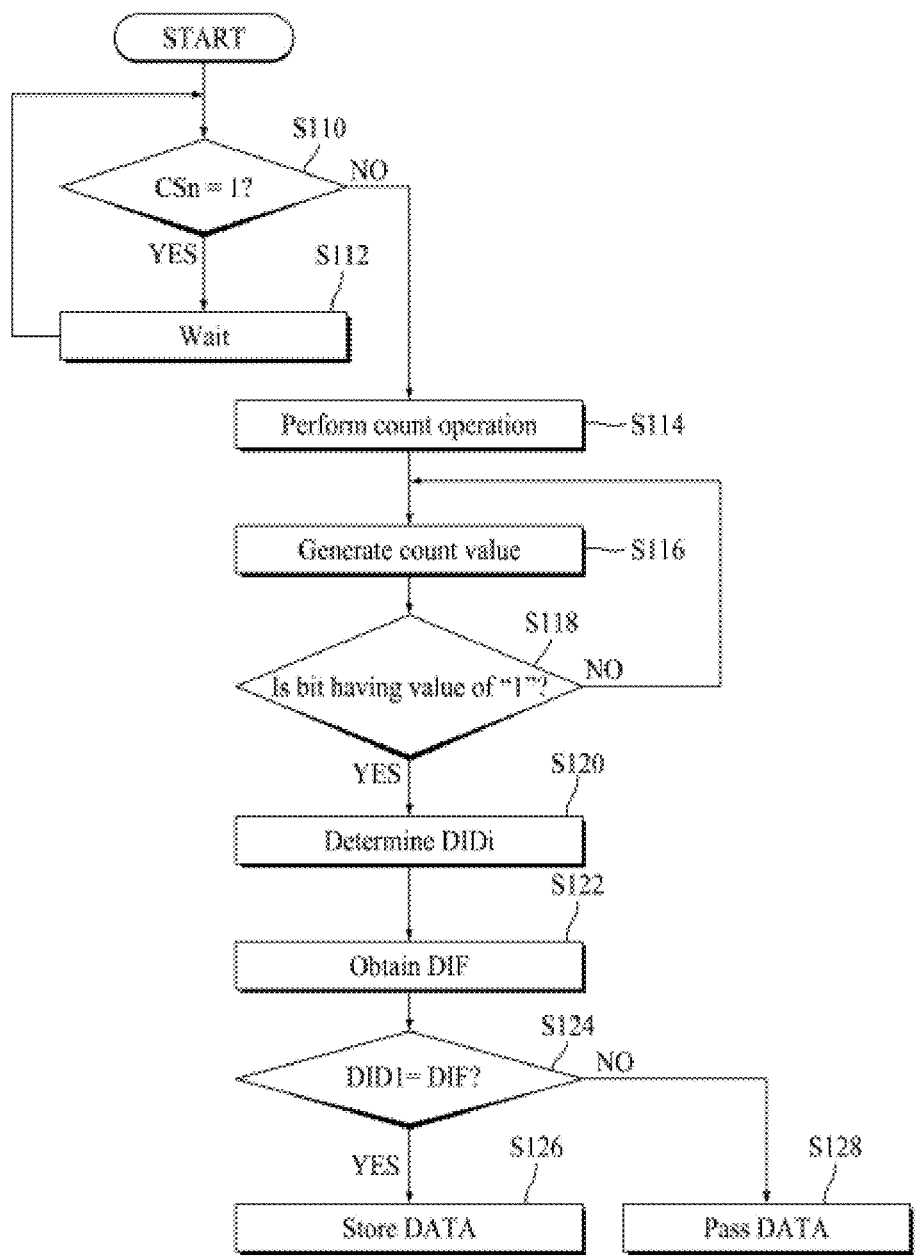
FIG. 8 is a flowchart for describing an operation of the control circuit shown in FIG. 5.

Hereinafter, an operation of the control circuit according to the present disclosure will be described in more detail with reference to FIG. 8. FIG. 8 is a flowchart for describing an operation of the control circuit shown in FIG. 5;

The master apparatus M generates an input data packet SDI including first data FDATA, second data IDATA, and control data DATA and transmits the input data packet SDI to the first slave apparatus S1 connected to the packet generator 230. It is assumed that the first data FDATA includes 1000000 (bin), and second ID included in the second data IDATA is 00000011 (bin).

Meanwhile, the master apparatus M transmits the chip selection signal CSn to each of the slave apparatuses S1 to SN through the packet generator 230.

When a level of the chip selection signal CSn supplied to each of the slave apparatuses S1 to SN is a high level (YES in S110), each of the slave apparatuses S1 to SN waits until the level of the chip selection signal CSn transitions from the high level to a low level (S112).

When the level of the chip selection signal CSn transitions from the high level to the low level (NO in S110), the first counter of each of the slave apparatuses S1 to SN performs a count operation of increasing a count value every rising edge of the serial clock signal SCK (S114), and generates a count value according to the count operation (S116).

The first counter of each of the slave apparatuses S1 to SN determines a count value at the time at which a bit firstly having a value of "1" among bits of 1000000 (bin) included in the first data FDATA is input, as a first count value CNT1 (S118).

Since the first counter of the i-th slave apparatus Si detects "1" at an i-th rising edge of the serial clock signal SCK, it is assumed that the first count value CNT1 of the first counter of the i-th slave apparatus Si is "i-1" and the first count value CNT1 is maintained as "i-1" as it is until the first count value CNT1 is reset.

For example, it is assumed that the first count value CNT1 of the first counter of the first slave apparatus S1 is 0 (dec) since the first counter of the first slave apparatus S1 detects "1" at a first rising edge of the serial clock signal SCK, it is assumed that the first count value CNT1 of the first counter of the second slave apparatus S2 is 1 (dec) since the first counter of the second slave apparatus S2 detects "1" at a second rising edge of the serial clock signal SCK, and it is assumed that the first count value CNT1 of the first counter of the third slave apparatus S3 is 2 (dec) since the first counter of the third slave apparatus S3 detects "1" at a third rising edge of the serial clock signal SCK.

The ID determination circuit of each of the slave apparatuses S1 to SN determines first ID DIDi thereof using the first count value CNT1 and an initial count value of each of the slave apparatuses S1 to SN (S120).

As described above, the first slave apparatus S1 determines the first ID DIDi (where i=1) thereof as 00000001 (bin), the second slave apparatus S2 determines the first ID DIDi (where i=2) thereof as 00000010 (bin), the third slave apparatus S3 determines the first ID DIDi (where i=3) thereof as 00000011 (bin), and the 40-th slave apparatus S40 determines the first ID DIDi (where i=40) thereof as 00101000 (bin).

The second-ID processing circuit of each of the slave apparatuses S1 to SN obtains second ID DIF (=00000011 (bin)) included in the second data IDATA of the input data packet SDI (S122).

The comparison circuit of each of the slave apparatuses S1 to SN compares the first ID DIDi thereof with the second ID of 00000011 (bin) (S124).

As an example, the comparison circuit of the third slave apparatus S3 compares the first ID DID3 (=00000011 (bin)) of the third slave apparatus S3 and the second ID DIF (=00000011 (bin)) included in the second data IDATA of the input data packet SDI in units of bits. Since the first ID DID3 (=00000011 (bin)) and the second ID DIF (=00000011 (bin)) match each other, the comparison circuit of the third slave apparatus S3 outputs comparison signal having a high level to the selection circuit of the third slave apparatus S3 and the selection circuit of the third slave apparatus S3 stores the control data DATA input to the third slave apparatus S3 (S126).

However, each of the comparison circuits of the remaining slave apparatuses S1, S2, S4, . . . , and SN except for the third slave apparatus S3 outputs comparison signal having a low level to each of the selection circuits of the remaining slave apparatuses S1, S2, S4, . . . , and SN and thus, each of the remaining slave apparatuses S1, S2, S4, . . . , and SN outputs dummy data instead of the control data DATA included in the input data packet SDI input to the remaining slave apparatuses S1, S2, S4, . . . , and SN. In other words, the remaining slave apparatuses S1, S2, S4, . . . , and SN pass the control data DATA included in the input data packet SDI input to each of the remaining slave apparatuses S1, S2, S4, . . . , and SN (S128).

The above described data transmission system 100 according to the present disclosure may be implemented a dimming control system for controlling dimming in a display device. Hereinafter, an example of a case in which the data transmission system 100 according to the present disclosure is implemented as the dimming control system for controlling dimming in the display device will be described in detail with reference to FIGS. 9 to 12.

Figure 9:
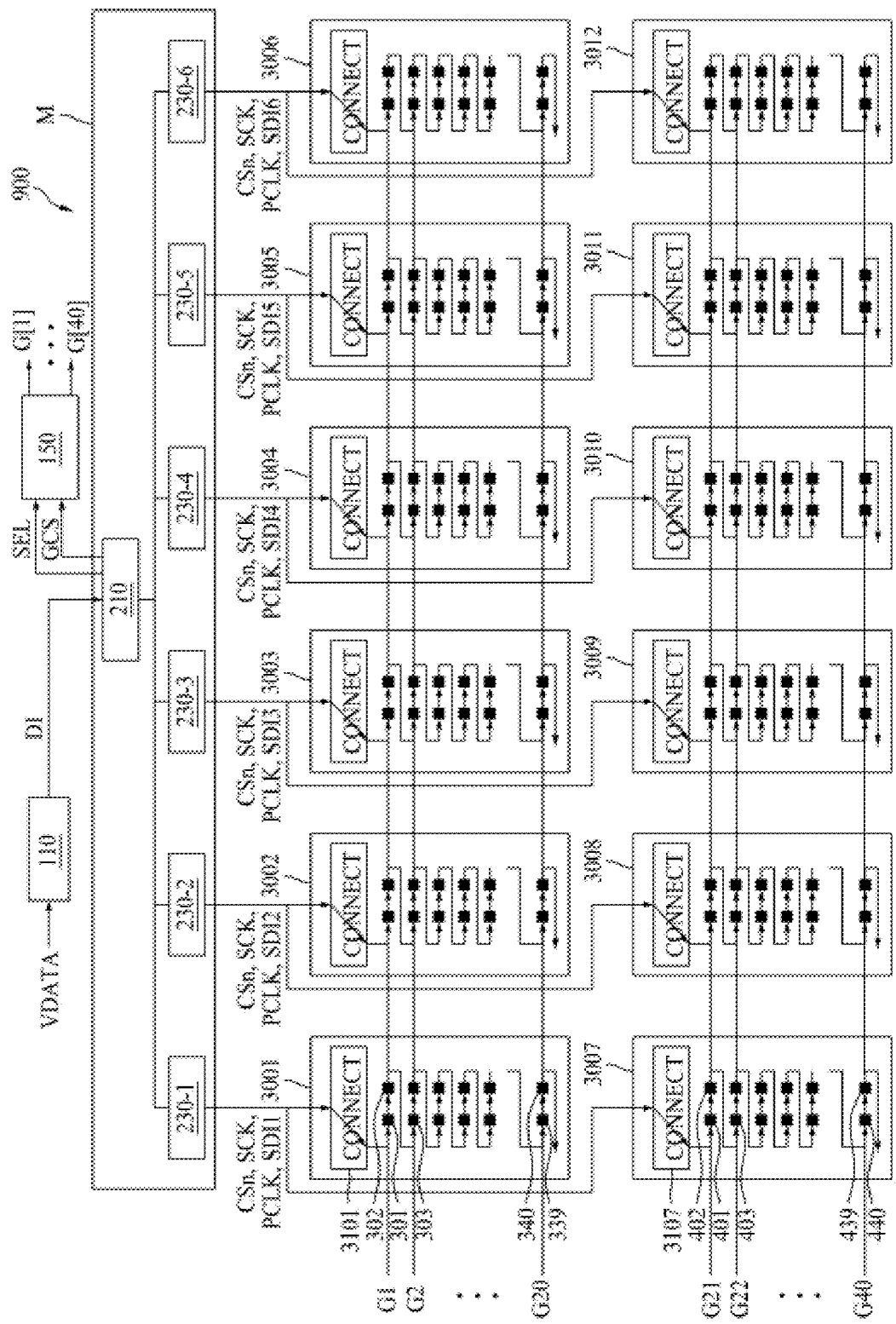
FIG. 9 is a diagram exemplarily illustrating a dimming control system implemented using a data transmission system according to one embodiment of the present disclosure.

FIG. 9 is a diagram exemplarily illustrating a dimming control system implemented using the data transmission system according to one embodiment of the present disclosure. As shown in FIG. 9, the dimming control system 900 includes a dimming data generation circuit 110, a master apparatus M, boards 3001 to 3012 on which a plurality of slave apparatuses 301 to 340 and 401 to 440 are mounted, and a gate control signal generation circuit 150.

The dimming control system 900 shown in FIG. 9 may be used for controlling dimming of a display device or television (TV) that includes a backlight unit (BLU). At this time, the display device may be a thin-film-transistor liquid-crystal display (TFT-LCD) device or an LED display device.

In accordance with the present embodiment, a display panel included in the display device may be divided into a plurality of regions (e.g., 12 regions), and the plurality of boards 3001 to 3012 may be arranged to correspond to the respective regions of the display panel as shown in FIG. 9. Each of the boards 3001 to 3012 may be a printed circuit board (PCB).

The plurality of slave apparatuses 301 to 340 are mounted on each of the boards 3001 to 3006, and the plurality of slave apparatuses 401 to 440 are mounted on each of the boards 3007 to 3012. The slave apparatuses mounted on each of the boards 3001 to 3012 may constitute a slave apparatus group. As an example, one slave apparatus group mounted on one board may include 40 slave apparatuses 301 to 340 or 401 to 440. In accordance with the embodiment, 2 slave apparatuses may be disposed for each row of each of the boards 3001 to 3012. In addition, the slave apparatuses 301 to 340 may be disposed in a form of an m*n matrix in each of the boards 3001 and 3006 and the slave apparatuses 401 to 440 may be disposed in the form of the m*n matrix in each of the boards 3007 and 3012, wherein m may be 20 and n may be 2.

Meanwhile, a plurality of light sources (not shown) to be controlled may be installed on each of the boards 3001 to 3012 so as to be electrically connected to the slave apparatuses 301 to 340 and 401 to 440, respectively. Each of the slave apparatuses 301 to 340 and 401 to 440 may control dimming of a predetermined number of light sources (e.g., six LEDs). In one embodiment, the light source may be a Light Emitting Diode (LED) or an organic LED (OLED).

Hereinafter, for convenience of description, the boards 3001 to 3006 disposed at an upper end region in FIG. 9 will be referred to as a first board group, and the boards 3007 to 3012 disposed at a lower end region will be referred to as a second board group.

Each of the slave apparatuses 301 and 302 disposed in a first row of each of the boards 3001 to 3006 of the first board group is commonly connected to a first gate line G1, each of the slave apparatuses 303 and 304 disposed in a second row of each of the boards 3001 to 3006 of the first board group is commonly connected to a second gate line G2, and each of the slave apparatuses 339 and 340 disposed in a 20-th row of each of the boards 3001 to 3006 of the first board group is commonly connected to a 20-th gate line G20.

Each of the slave apparatuses 401 and 402 disposed in a first row of each of the boards 3007 to 3012 of the second board group is commonly connected to a 21-st gate line G21, each of the slave apparatuses 403 and 404 disposed in a second row of each of the boards 3007 to 3012 of the second board group is commonly connected to a 22-nd gate line G22, and each of the slave apparatuses 439 and 440 disposed in a 20-th row of each of the boards 3007 to 3012 of the second board group is commonly connected to a 40-th gate line G40.

In accordance with the above-described embodiment, when each of the slave apparatuses 301 to 340 mounted on each of the boards 3001 to 3006 and the slave apparatuses 401 to 440 mounted on each of the boards 3007 to 3012 receives an input data packet including dimming data from the master apparatus M, dimming information corresponding to the dimming data is directly displayed through the light sources, which are controlled by the respective slave apparatuses 301 to 340 and 401 to 440, by a corresponding gate control signal transmitted through the corresponding gate line. Accordingly, a variation between an image processed by the display device and the dimming information processed by the dimming control system 900 is less than one frame.

As each of the slave apparatuses 301 to 340 and 401 to 440 connected to the gate lines G1 to G40 operates simultaneously according to the gate control signal transmitted through each of the gate lines G1 to G40, each of the slave apparatuses 301 to 340 and 401 to 440 controls local dimming of a region managed by itself. The gate control signals transmitted through the gate lines G1 to G40 are sequentially generated and do not overlap each other.

Since the dimming control system 900 performs local dimming for the light sources in units of gate lines, the dimming control system 900 according to the present disclosure has an effect of preventing a mismatch between the image and the local dimming as compared to a conventional dimming control technique in which local dimming is performed in units of frames.

The boards 3001 and 3007 disposed in a first column are commonly connected to a first packet generator 230-1 of the master apparatus M, and the boards 3002 and 3008 disposed in a second column are commonly connected to a second packet generator 230-2 of the master apparatus M, and the boards 3006 and 3012 disposed in a sixth column are commonly connected to a sixth packet generator 230-6 of the master apparatus M.

For example, even when the slave apparatuses 301 and 401 respectively disposed on the different boards 3001 and 3007 are connected to the first packet generator 230-1 respectively through connectors 3101 and 3107, the master apparatus M may control an operation of the slave apparatus 301 using a first gate control signal G[1] transmitted through the first gate line G1 and may control an operation of the slave apparatus 401 using a 21-st gate control signal G[21] transmitted through the 21-st gate line G21.

Identification information (which is referred to as "ID") that may uniquely identify an i-th slave apparatus disposed on each of the boards 3001 to 3012 is identical to each other. Here, i is a natural number and satisfies 140.

For example, the ID of the slave apparatus 301 firstly disposed on each of the boards 3001 to 3006 and the ID of the slave apparatus 401 firstly disposed on each of the boards 3007 to 3012 are identical to each other, and the ID of the slave apparatus 340 lastly disposed on each of the boards 3001 to 3006 and the ID of the slave apparatus 440 lastly disposed on each of the boards 3007 to 3012 are identical to each other.

The dimming data generation circuit 110 receives video data VDATA corresponding to RBG values from the outside, analyzes the video data VDATA, generates dimming data DI according to the analysis result, and outputs the dimming data DI to the controller 210 of the master apparatus M.

Figure 10:
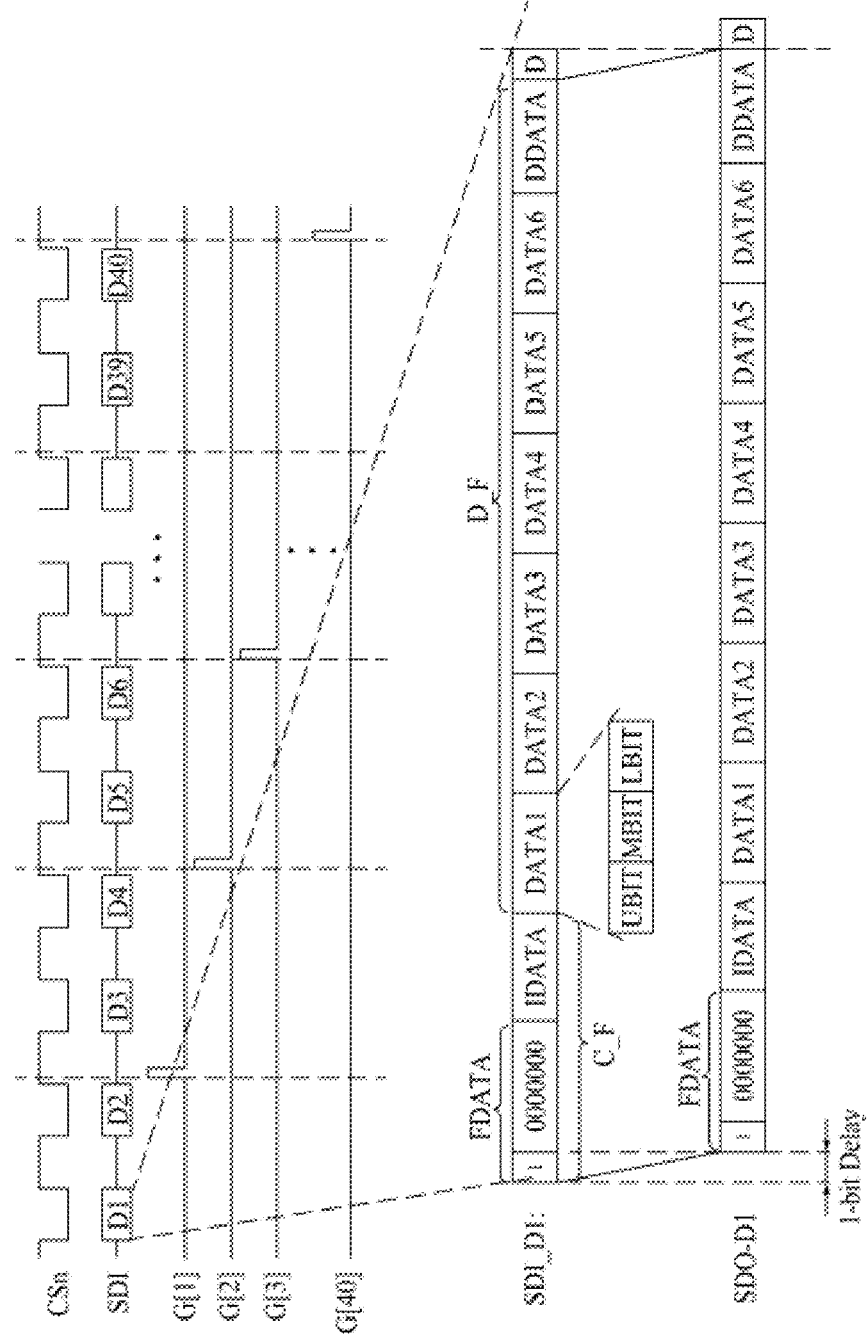
FIG. 10 is a diagram illustrating a timing of each of signals used in the dimming control system shown in FIG. 9.

The gate control signal generation circuit 150 may generate gate control signals G[1] to G[40] having timings as shown in FIG. 10 in response to a gate control signal GCS and selection signals SEL, which are output from the controller 210. For example, the gate control signal generation circuit 150 may include a demultiplexer. For example, the demultiplexer may generate the gate control signals G[1] to G[40] having the timings shown in FIG. 10 in response to the gate control signal GCS input to an input terminal thereof and the selection signals SEL input to selection terminals. For example, the first gate control signal G[1] is supplied to the first gate line G1, and the 40-th gate control signal G[40] is supplied to the 40-th gate line G40.

The master apparatus M generates an input data packet SDIi based on a serial peripheral interface (SPI) communication protocol based on the dimming data DI. Here, unlike in FIG. 2, the master apparatus M shown in FIG. 9 includes six packet generators 230-1 to 230-6. Each of the packet generators 230-1 to 230-6 outputs the input data packets SDI1 to SDI6 to the firstly disposed slave apparatuses 301 and 401 among the plurality of slave apparatuses 301 to 340, which are mounted on each of the boards 3001 to 3006 in a daisy-chain manner, and the plurality of slave apparatuses 401 to 440, which are mounted on each of the boards 3007 to 3012 in a daisy-chain manner.

The structure and transmission and reception timings of the input data packet SDIi in a case in which each of the slave apparatuses 301 to 340 disposed on each of the boards 3001 to 3006 and the slave apparatuses 401 to 440 disposed on each the boards 3007 to 3012 controls local dimming of six light sources will be described with reference to FIG. 10.

FIG. 10 is a diagram illustrating a timing of each of signals used in the dimming control system shown in FIG. 9. As shown in FIG. 10, the input data packet SDI includes a plurality of data packets D1 to D40. In this case, an i-th data packet Di included in the input data packet SDI is a data packet for adjusting brightness of six light sources connected to the i-th slave apparatus.

For example, a first data packet D1 is a data packet for adjusting brightness of the six light sources connected to a first slave apparatus 301, a second data packet D2 is a data packet for adjusting brightness of the six light sources connected to a second slave apparatus 302, and a 40-th data packet D40 is a data packet for adjusting brightness of the six light sources connected to a 40-th slave apparatus 340.

Further, when the six light sources are connected to one slave apparatus, first dimming data DATA1 included in the first data packet D1 is dimming data for adjusting dimming of a first light source among the six light sources, second dimming data DATA2 is dimming data for adjusting dimming of a second light source among the six light sources, and sixth dimming data DATA6 is dimming data for adjusting dimming of a sixth light source among the six light sources.

At this time, the six light sources may be connected to each slave apparatus through connection pins (not shown), and each slave apparatus controls each of the six light sources using the first to sixth data packets D1 to D6 by supplying the corresponding dimming data to the connection pin that is determined in advance according to the order in which the first to sixth dimming data DATA1 to DATA6 included in the first data packet D1 are received.

In FIG. 10, each of the data packets D1 to D40 is illustrated as including six pieces of dimming data DATA1 to DATA6 because it is assumed that each of the slave apparatuses 301 to 340 and 401 to 440 controls six light sources, but when each of the slave apparatuses 301 to 340 and 401 to 440 controls T light sources (where T is a natural number greater than or equal to 2), T pieces of dimming data DATA1 to DATAT are included in each of the data packets D1 to D40.

The gate control signal generation circuit 150 controls an activation timing of each of the gate control signals G[1] to G[40]. For example, as shown in FIG. 10, the gate control signal generation circuit 150 generates the first gate control signal G[1] in the form of a pulse after two data packets D1 and D2 are supplied to two slave apparatuses 301 and 302, generates a second gate control signal G[2] in the form of a pulse after two data packets D3 and D4 are supplied to two slave apparatuses 303 and 304, and generates a 40-th gate control signal G[40] in the form of a pulse after two data packets D39 and D40 are supplied to two slave apparatuses 339 and 340.

A data format of each of the data packets D1 to D40 is the same. For example, each of the data packets D1 to D40 may include first data FDATA, second data IDATA, and six pieces of dimming data DATA1 to DATA6, and may further include first dummy data DDATA depending on the embodiment. In addition, each of the dimming data DATA1 to DATA6 includes upper bits UBIT, intermediate bits MBIT, and lower bits LBIT.

A data format of each of input data packets SDI2 to SDI6 is the same as a data format of an input data packet SDI1. Accordingly, an operation of each of the slave apparatuses, which processes each of the input data packets SDI2 to SDI6 is almost identical to an operation of each of the slave apparatuses, which processes the data packet SDI1.

At this time, as shown in FIG. 10, each of the dimming data DATA1 to DATA6 may include the upper bits UBIT, the intermediate bits MBIT, and the lower bits LBIT, and each of the slave apparatuses 301 to 340 and 401 to 440 may determine whether each of the dimming data DATA1 to DATA6 is low-grayscale data or high-grayscale data using the intermediate bits MBIT. When each of the dimming data DATA1 to DATA6 is the low-grayscale data, each of the slave apparatuses 301 to 340 and 401 to 440 may adjust brightness of the corresponding light source by a PWM method (or a PWM signal) using the upper bits UBIT. When each of the dimming data DATA1 to DATA6 is the high-grayscale data, each of the slave apparatuses 301 to 340 and 401 to 440 may adjust the brightness of the corresponding light source using both the intermediate bits MBIT and the lower bits LBIT.

An example of the input data packet SDI generated by the master apparatus M using the dimming data DI is the same as that shown in FIG. 3, and thus a detailed description thereof will be omitted.

Since each of the packet generators 230-1 to 230-6 is commonly connected to one of the boards 3001 to 3006 included in the first board group and one of the boards 3007 to 3012 included in the second board group, each of the packet generators 230-1 to 230-6 outputs the input data packet SDIi generated based on bits determined by the controller 210 to the first slave apparatus among the plurality of slave apparatuses 301 to 340 and 401 to 440 that are connected in a daisy-chain manner on two board connected thereto. Meanwhile, in addition to the input data packets SDI1 to SDI6, each of the packet generators 230-1 to 230-6 may additionally output a chip selection signal CSn, a serial clock signal SCLK, and a PWM clock signal PCLK for dimming control to the first slave apparatus of each of the boards 3001 to 3012 connected thereto.

Meanwhile, unlike the master apparatus M shown in FIG. 2, the master apparatus M shown in FIG. 9 may generate and output the gate control signal GCS and the selection signals SEL for generating the gate control signals G[1] to G[40], and the gate control signal GCS may be divided as many as the number of the gate lines by the gate control signal generation circuit 150 and input to the respective gate lines G1 to G40.

Each of the slave apparatuses 301 to 340 and 401 to 440 controls dimming of the plurality of light sources connected to the corresponding slave apparatus using the input data packet received from the master apparatus M. Hereinafter, the configuration of each of the slave apparatuses 301 to 340 and 401 to 440 according to the one embodiment will be described in detail with reference FIG. 11.

Figure 11:
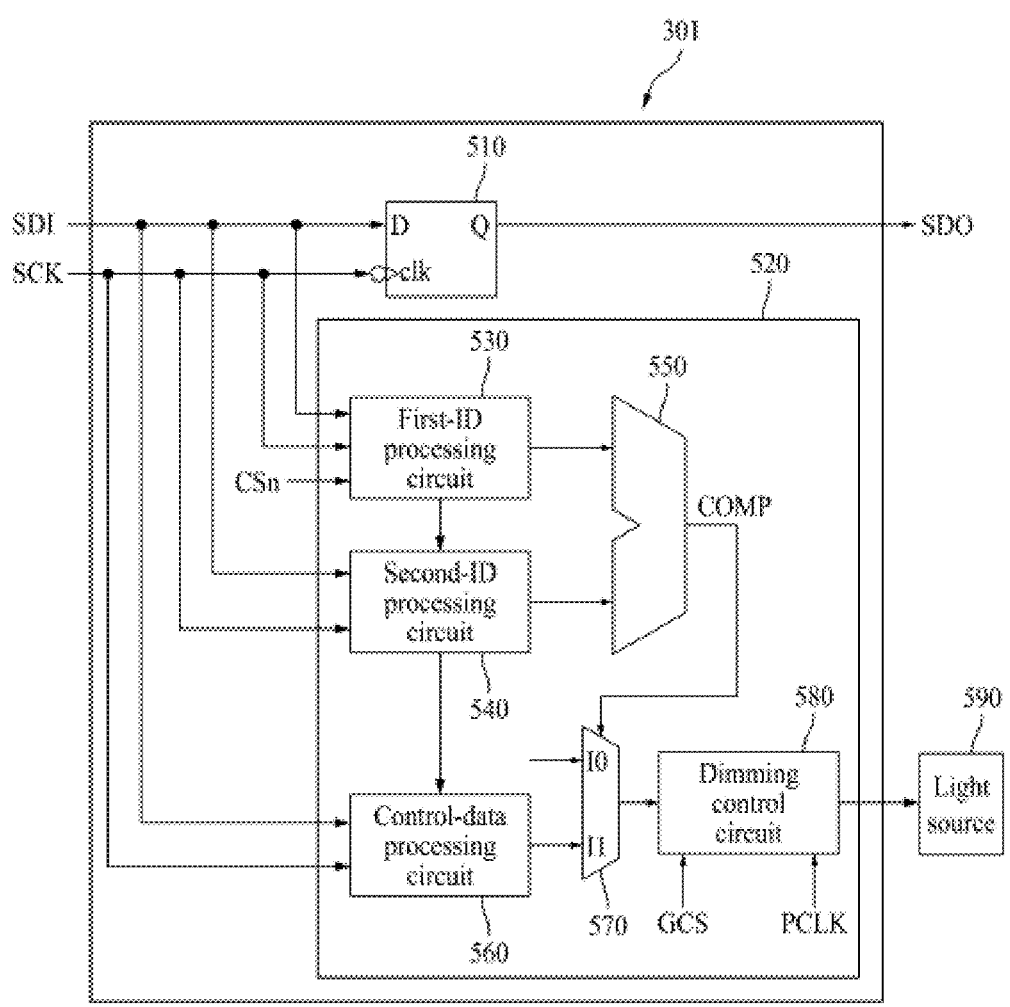
FIG. 11 is a block diagram schematically illustrating a configuration of slave apparatus shown in FIG. 9.

FIG. 11 is a block diagram schematically illustrating a configuration of slave apparatus shown in FIG. 9. The structure and operation of each slave apparatuses 301 to 340 and 401 to 440 shown in FIG. 9 are the same, and hereinafter, for convenience of description, descriptions are made based on the structure and operation of first slave apparatus 301 mounted on the first board 3001.

As shown in FIG. 11, the first slave apparatus 301 includes a D-flip-flop circuit 510 and a control circuit 520.

The D-flip-flop circuit 510 captures the input data packet SDI at a second edge of the serial clock signal SCK to output the output data packet SDO. The D-flip-flop circuit 510 outputs the output data packet SDO generated by delaying the input data packet SDI by one bit to the second slave apparatus S2. The function of the D-flip-flop circuit 510 shown in FIG. 11 is the same that of shown in FIG. 4, and thus a detailed description will be omitted.

The control circuit 520 performs a count operation in response to a first edge of the serial clock signal SCK, and determines the first ID using a count value at the time at which a bit firstly having a value of "1" among the bits included in the first data FDATA is input. The control circuit 520 compares the determined first ID with the second ID included in the second data IDATA, and controls the light source 590 connected to the first slave apparatus 301 using the dimming data DATA1 to DATA6 when the first ID and the second ID match and discards the dimming data DATA1 to DATA6 when the first ID and the second ID do not match.

To this end, the control circuit 520 includes a first-ID processing circuit 530, a second-ID processing circuit 540, a comparison circuit 550, a control-data processing circuit 560, a selection circuit 570, and a dimming control circuit 580 as shown in FIG. 11. The first-ID processing circuit 530, the second-ID processing circuit 540, the comparison circuit 550, the control-data processing circuit 560, and a selection circuit 570 are the same those shown in FIG. 5, and thus a detailed description will be omitted.

The dimming control circuit 580 controls dimming of a light source 590 based on the dimming data DATA1 to DATA6 output from the selection circuit 570. In one embodiment, the dimming control circuit 580 may control the dimming of the light source 590 by the PWM driving method. In another embodiment, the dimming control circuit 580 may control the dimming of the light source 590 by the linear driving method using an analog signal generated based on the dimming data DATA1 to DATA6.

In still another embodiment, the dimming control circuit 580 may analyze a grayscale value of the dimming data DATA1 to DATA6 and perform a hybrid dimming control for controlling the dimming of the light source 590 by selecting one of a PWM driving method or a linear driving method according to the grayscale value.

Figure 12:
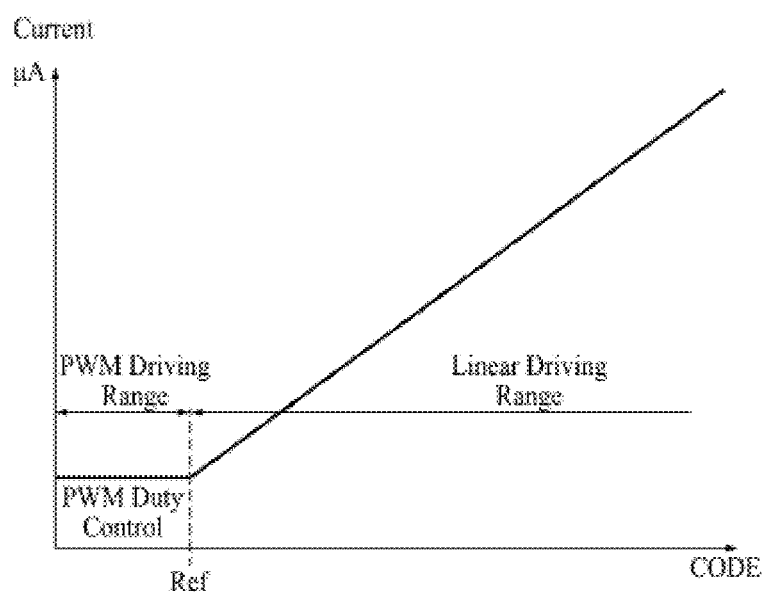
FIG. 12 is a schematic diagram for describing a hybrid dimming control according to one embodiment of the present disclosure.

FIG. 12 conceptually illustrates a method in which the dimming control circuit 580 according to the present disclosure controls the dimming of the light source 590 by a hybrid dimming control method. Referring to FIG. 12, when a first value corresponding to bits CODE included in the dimming data DATA1 to DATA6 is less than or equal to a second value corresponding to reference bits Ref, the dimming control circuit 580 determines that the dimming data DATA1 DATA6 is the low-grayscale data and adjusts the dimming of the light source 590 by the PWM driving method. In addition, when the first value is greater than the second value, the dimming control circuit 580 determines that the dimming data DATA1 to DATA6 is the high-grayscale data, and adjusts the dimming of the light source 590 by the linear driving method.

Specifically, the dimming control circuit 580 may control the dimming of the light source 590 by the PWM driving method when the dimming data DATA1 to DATA6 is low-grayscale data, and control the dimming of the light source 590 using the analog signal generated based on the dimming data DATA1 to DATA6 when the dimming data DATA1 to DATA6 is high-grayscale data. In one embodiment, the dimming control circuit 580 may determine whether the dimming data DATA1 to DATA6 is the low-grayscale data or high-grayscale data by determining whether at least one bit having a value of "1" is present in the intermediate bits MBIT of the dimming data DATA1 to DATA6.

For example, when the dimming data DATA1 to DATA6 is 0001000000100000 (bin) and the intermediate bits MBIT is 000000 (bin), the dimming control circuit 580 may determine that the dimming data DATA1 to DATA6 is the low-grayscale data because none of the bits having a value of "1" are included in the intermediate bits MBIT (=000000).

When the dimming control circuit 580 determines that the dimming data DATA1 to DATA6 is the low-grayscale data, the dimming control circuit 580 generates a PWM signal using the upper bits UBIT among the dimming data DATA1 to DATA6, the PWM clock signal PLCK, and a first gate control signal G[1] transmitted via a first gate line G1 and controls the dimming of the light source 590 by the PWM signal. To this end, the dimming control circuit 580 includes a PWM generator (not shown) that generates the PWM signal using the upper bits UBIT among the dimming data DATA1 to DATA6, the PWM clock signal PLCK, and the first gate control signal G[1]. At this time, the dimming control circuit 580 provides predetermined reference data (e.g., 000000111111(bin)) to a digital-analog converter (not shown) to be described later, so that the digital-analog converter outputs an analog signal corresponding to the reference data.

As another example, when the dimming data DATA1 to DATA6 is 0000000001000001 (bin) or 65 (dec) and the intermediate bits MBIT is 000001 (bin), the dimming control circuit 580 may determine that the dimming data DATA1 to DATA6 is the high-grayscale data because one bit having a value of "1" is included in the intermediate bits MBIT (=000001).

When the dimming control circuit 580 determines that the dimming data DATA1 to DATA6 is the high-grayscale data, the dimming control circuit 580 controls the dimming of the light source 590 using an analog signal corresponding to data (00001000001 (bin)) including both the intermediate bits MBIT and the lower bits LBIT among the dimming data DATA1 to DATA6. To this end, the dimming control circuit 580 may include a digital-to-analog converter (not shown)

that converts data (00001000001 (bin)) including the intermediate bits MBIT and the lower bits LBIT of dimming data DATA1 to DATA6 to the analog signal, a charging capacitor (not shown) that charges an electric charge corresponding to the analog signal, and an amplifier circuit (not shown) amplifying the difference between the voltage charged in the charging capacitor and a reference voltage. The dimming control circuit 580 may control the dimming of the light source 590 by adjusting the amount of current flowing through the light source 590 based on the amplification result by the amplifier circuit.

Hereinafter, the hybrid dimming control method performed by the dimming control system according to the present disclosure will be described with reference to FIG. 13.

Figure 13:
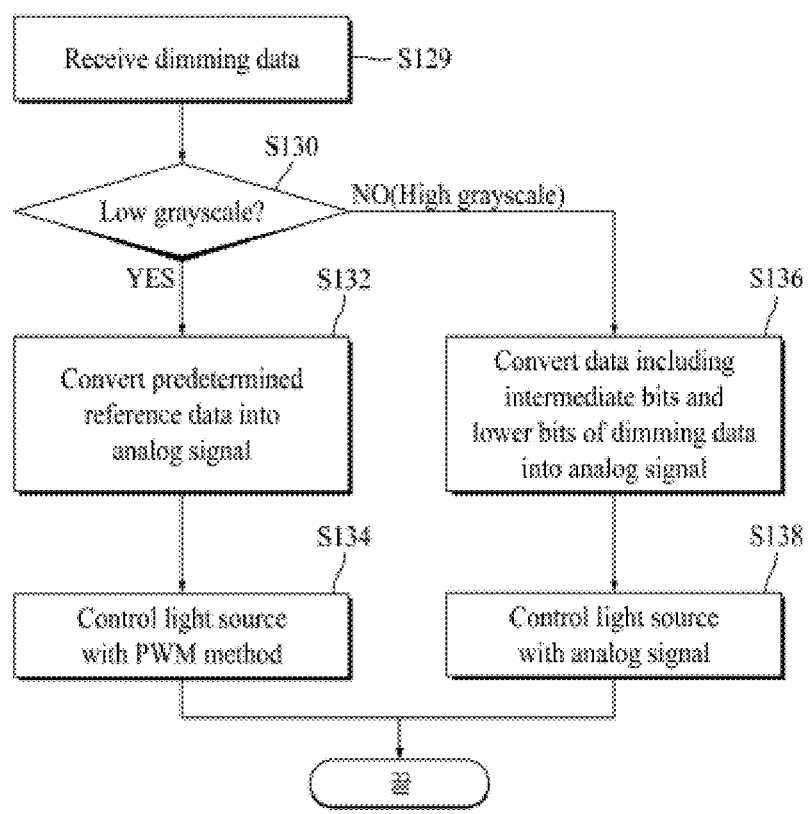
FIG. 13 a flowchart for describing an operation of a dimming control circuit shown in FIG. 11.

FIG. 13 a flowchart for describing an operation of a dimming control circuit shown in FIG. 11. In FIG. 13, it is assumed that a third slave apparatus among the plurality of slave apparatuses is designated as a slave apparatus for processing a dimming data.

The dimming control circuit 580 of the third slave apparatus 303 designated as a slave apparatus for processing the dimming data DATA1 to DATA6 receives the dimming data DATA1 to DATA6 (S129). Thereafter, the dimming control circuit 580 extracts (or separates) upper bits UBIT, intermediate bits MBIT, and lower bits LBIT from the dimming data DATA1 to DATA6, and determines whether at least one bit having a value of "1" is present in the intermediate bits MBIT.

When none of the bits having a value of "1" are included in the intermediate bits MBIT, the dimming control circuit 580 of the third slave apparatus 303 determines the dimming data DATA1 to DATA6 as low-grayscale data (YES in S130).

When the dimming data DATA1 to DATA6 is determined as the low-grayscale data, the dimming control circuit 580 of the third slave apparatus 303 converts predetermined reference data (e.g., 000000111111 (bin)) into an analog signal (S132), and controls local dimming of the light source 590 by a PWM method using a PWM signal corresponding to the upper bits UBIT and the analog signal that is converted in S132 (S134).

However, when at least one bit having a value of "1" is included in the intermediate bits MBIT, the dimming control circuit 580 of the third slave apparatus 303 determines the dimming data DATA1 to DATA6 as high-grayscale data (NO in S130).

When the dimming data DATA1 to DATA6 is determined as the high-grayscale data, the dimming control circuit 580 of the third slave apparatus 303 converts data including the intermediate bits MBIT and the lower bits LBIT into an analog signal (S136).

The dimming control circuit 580 of the third slave apparatus 303 controls local dimming of the light source 590 using the analog signal corresponding to the data including the intermediate bits MBIT and the lower bits LBIT (S138).

As described above, the dimming control circuit 580 of each of the slave apparatuses analyzes (or classifies) types of the dimming data DATA1 to DATA6 by analyzing the dimming data DATA1 to DATA6. For example, the dimming control circuit 580 analyze (or classify) the types of the dimming data DATA1 to DATA6 using the intermediate bits MBIT included in the dimming data DATA1 to DATA6.

The dimming control circuit 580 controls the local dimming of the light source 590 using the upper bits UBIT including a most significant bit (MSB) of the dimming data DATA1 to DATA6 when the dimming data DATA1 to DATA6 is the low-grayscale data (e.g., a first type), and controls the local dimming of the light source 590 using the intermediate bits MBIT and the lower bits LBIT including a least significant bit (LSB) of the dimming data DATA1 to DATA6 when the dimming data DATA1 to DATA6 is the high-grayscale data (e.g., a second type).

When the above-described hybrid dimming control method of the present disclosure is used, a response time of the dimming control improves, and a time difference between a display image and dimming of a backlight unit is less than one frame, so that the display image and the dimming of the backlight unit may match each other.

It should be understood by those skilled in the art that the present disclosure can be implemented in other specific forms without changing the technical concept and essential features of the present disclosure.

Further, the methods described herein may be implemented, at least in part, using one or more computer programs or components. The components may be provided as a series of computer instructions on a computer readable medium or machine readable medium, including a volatile or non-volatile memory. The instructions may be provided as software or firmware, and may, in whole or in part, be implemented in a hardware configuration such as application-specific integrated circuits (ASICs), field-programmable gate arrays (FPGAs), digital signal processors (DSPs), or other similar devices. The instructions may be configured to be executed by one or more processors or other hardware configurations, and the processor or other hardware components may perform all or part of the methods and procedures disclosed herein when executing the series of computer instructions.

According to the present disclosure, since an output data packet of each of a plurality of slave apparatuses is delayed only by one bit from an input data packet, an overall delay time generated by the plurality of slave apparatuses can be reduced, and the timing margin is improved, so that the number of slave apparatuses connectable to one master apparatus can be increased.

Further, according to the present disclosure, a master apparatus and a plurality of slave apparatuses are connected in a daisy-chain manner, so that the number of channels between the master apparatus and the slave apparatuses can be reduced.

Further, according to the present disclosure, each of slave apparatuses can set identification information (ID) thereof using bits included in first data of an input data packet transmitted from a master apparatus, so that each of the slave apparatuses can determine by itself whether control data transmitted from the master apparatus is data to be processed by itself based on the ID thereof.

Further, according to the present disclosure, when a data transmission system is implemented as a dimming control system for controlling local dimming of a display apparatus, the local dimming can be performed for a backlight unit in units of gate lines, so that a mismatch between an image and the local dimming can be prevented as compared to a related art in which local dimming is performed in units of frames.

Further, according to the present disclosure, when a data transmission system is implemented as a dimming control system for controlling local dimming of a display apparatus, a time for transmitting an input data packet from a master apparatus to slave apparatuses is reduced, so that local dimming for light sources can be performed quickly and a response time can be improved.

Therefore, the above-described embodiments should be understood to be exemplary and not limiting in every aspect.

The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. An apparatus for transmitting data based on serial communication, the apparatus comprising:
a master apparatus configured to generate an input data packet including first data, second data, and control data; and
a slave apparatus group consisting of a plurality of slave apparatuses connected in a daisy-chain manner to the master apparatus,
wherein the plurality of slave apparatuses are configured to sequentially generate output data packets based on the input data packet from the master apparatus, and a last output data packet output from a last slave apparatus of the plurality of slave apparatuses is output to the master apparatus, and
wherein each of the slave apparatuses determines first identification information (ID), which is ID thereof, using a most significant bit (MSB) among bits included in the first data, extracts second ID, which is ID of the slave apparatus to process the control data, from the second data, and controls a target device connected to the slave apparatus, using the control data when the first ID and the second ID match.

2. The apparatus of claim 1, wherein
a value of the MSB is set to "1," and
the slave apparatus performs a count operation in response to a first edge of a serial clock signal output from the master apparatus, and determines the first ID using a count value at a time at which the MSB is input.

3. The apparatus of claim 1, wherein the slave apparatus captures the input data packet at a second edge of a serial clock signal output from the master apparatus and outputs the input data packet by delaying the input data packet by one bit.

4. The apparatus of claim 1, wherein
the master apparatus includes:
a controller configured to determine bits constituting the first data, bits constituting the second data, and bits constituting the control data; and
a packet generator configured to generate the input data packet by arranging the bits, which are determined by the controller, according to a serial peripheral interface (SPI) protocol,
wherein the packet generator is connected to a first slave apparatus of the slave apparatus group.

5. The apparatus of claim 1, wherein
the slave apparatus group is provided as a plurality of slave apparatus groups,
each of the slave apparatus groups is mounted on a physically separated printed circuit board (PCB), and
two slave apparatus groups of the slave apparatus groups are connected to one packet generator included in the master apparatus.

6. The apparatus of claim 1, wherein
the target device is a light source of a back light unit (BLU),
the control data is dimming data for controlling dimming of the light source, and
the slave apparatus analyzes the dimming data, and controls the light source by a pulse width modulation (PWM) driving method when the dimming data has a value less than or equal to a predetermined reference grayscale value, and controls the light source using an analog signal, which is generated based on the dimming data, when the dimming data has a value greater than the reference grayscale value.

7. A slave apparatus comprising:
a D-flip-flop circuit configured to output an output data packet, which is generated by delaying an input data packet by one bit, when the input data packet including first data, second data, and control data is input; and
a control circuit configured to determine first identification information (ID), which is ID of the slave apparatus, using a most significant bit (MSB) set to "1" among bits included in the first data, extract second ID, which is ID of the slave apparatus to process the control data, from the second data, and control a target device using the control data when the first ID and the second ID match,
wherein the control circuit is configured to:
determine the first ID using a count value at a time at which the MSB is input among the bits included in the first data;
extract the second ID from the second data;
compare the first ID and the second ID to generate a comparison signal; and
output one of dummy data corresponding to a first voltage and the control data to the target device in response to the comparison signal.

8. The slave apparatus of claim 7, wherein the control circuit includes:
a first-ID processing circuit configured to determine the first ID;
a second-ID processing circuit configured to extract the second ID;
a comparison circuit configured to generate the comparison signal; and
a selection circuit configured to output the one of the dummy data and the control data to the target device.

9. The slave apparatus of claim 8, wherein the first-ID processing circuit includes:
a first counter configured to perform a first count operation in response to a first edge of a serial clock signal and output the count value at a time at which the MSB is input as a first count value;
an ID determination circuit configured to determine the first ID using the first count value; and
a first register configured to receive and store the first ID determined by the ID determination circuit.

10. The slave apparatus of claim 8, wherein the second-ID processing circuit includes:
a second counter configured to perform a second count operation in response to a first edge of a serial clock signal to output a second count value;
an ID detection circuit configured to receive the input data packet and the second count value, detect the second data from the input data packet using the second count value, and detect the second ID from the detected second data; and
a second register configured to receive and store the second ID output from the ID detection circuit.

11. The slave apparatus of claim 10, wherein the control circuit further includes a control-data processing circuit configured to extract the control data from the input data packet and store the control data,
wherein the control-data processing circuit includes:
a control-data extraction circuit configured to receive the input data packet and the second count value, and extract the control data from the input data packet using the second count value; and a third register configured to receive and store the control data output from the control-data extraction circuit.

12. The slave apparatus of claim 7, wherein the D-flip-flop circuit captures the input data packet at a second edge of a serial clock signal and outputs the output data packet that is delayed by one bit from the input data packet.

13. The slave apparatus of claim 7, wherein the slave apparatus is any one of a plurality of slave apparatuses connected in a daisy-chain manner to a master apparatus, and wherein the master apparatus generates the input data packet based on a serial peripheral interface (SPI) protocol.

14. A method of transmitting data based on serial communication between a master apparatus and a plurality of slave apparatuses, the method comprising:

receiving an input data packet including first data, second data, and control data;

performing a count operation in response to a first edge of a serial clock signal;

determining first identification information (ID) using a count value at a time at which a most significant bit (MSB) having a value of "1" is input among bits included in the first data;

extracting second ID from the second data;

comparing the determined first ID and the extracted second ID; and controlling a target device using the control data when the determined first ID and the extracted second ID match, wherein the plurality of slave apparatuses are configured to sequentially generate output data packets based on the input data packet from the master apparatus, and a last output data packet output from a last slave apparatus of the plurality of slave apparatuses is output to the master apparatus.

15. The method of claim 14, further comprising capturing the input data packet at a second edge of the serial clock signal and outputting the output data packet that is delayed by one bit from the input data packet.

16. The method of claim 14, wherein the slave apparatus is any one of a plurality of slave apparatuses connected in a daisy-chain manner to the master apparatus, and wherein the master apparatus generates the input data packet based on a serial peripheral interface (SPI) protocol.

17. The method of claim 14, wherein the target device is at least one of a plurality of light sources included in a backlight unit, the control data is dimming data for controlling dimming of the light source, and the method further comprises controlling the light source by a pulse width modulation (PWM) driving method when the control data has a value less than or equal to a predetermined reference grayscale value, and controlling the light source using an analog signal, which is generated based on the control data, when the control data has a value greater than the reference grayscale value.

* * * * *